US012630002B2

(12) United States Patent
Shimatani et al.

(10) Patent No.: US 12,630,002 B2
(45) Date of Patent: May 19, 2026

(54) OFF-ROAD VEHICLE

(71) Applicant: KAWASAKI MOTORS, LTD., Hyogo (JP)

(72) Inventors: Kengo Shimatani, Akashi (JP); Yusuke Fujita, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 265 days.

(21) Appl. No.: 18/515,312

(22) Filed: Nov. 21, 2023

(65) Prior Publication Data

US 2025/0162398 A1 May 22, 2025

(51) Int. Cl.
| | |
|---|---|
| *B60K 5/00* | (2006.01) |
| *B60K 11/06* | (2006.01) |
| *B60K 13/04* | (2006.01) |
| *B62D 25/08* | (2006.01) |
| *B62D 33/02* | (2006.01) |

(52) U.S. Cl.
CPC ................ *B60K 5/00* (2013.01); *B60K 11/06* (2013.01); *B60K 13/04* (2013.01); *B62D 25/082* (2013.01); *B62D 33/02* (2013.01)

(58) Field of Classification Search
CPC .......... B60K 5/00; B60K 11/06; B60K 13/04; B60K 2005/003; B60K 11/04; B60K 13/02; B62D 25/082; B62D 33/02
See application file for complete search history.

(56) References Cited

U.S. PATENT DOCUMENTS

| | | | | |
|---|---|---|---|---|
| 7,290,827 | B2 * | 11/2007 | McNulty ................ | B62D 33/02 |
| | | | | 296/183.1 |
| 7,506,712 | B2 * | 3/2009 | Kato ...................... | B60K 13/02 |
| | | | | 180/68.1 |
| 10,315,510 | B2 * | 6/2019 | Toupin ................. | F16H 57/0489 |
| 10,576,817 | B2 * | 3/2020 | Battaglini ................ | B60G 3/20 |
| 10,724,420 | B2 * | 7/2020 | Momosaki .......... | F01N 13/1805 |
| 10,752,155 | B2 * | 8/2020 | Johnson ................... | B60P 3/07 |
| 11,161,554 | B2 * | 11/2021 | Stibich ................... | B62D 33/02 |
| 11,162,462 | B2 * | 11/2021 | Driant ................... | B60K 13/02 |

(Continued)

FOREIGN PATENT DOCUMENTS

| | | | | | |
|---|---|---|---|---|---|
| DE | 102022100048 | A1 * | 7/2022 | .......... | B62D 33/023 |
| JP | 2019116198 | A * | 7/2019 | ................ | F01P 3/18 |

(Continued)

*Primary Examiner* — James A Shriver, II
*Assistant Examiner* — Ian Bryce Shelton
(74) *Attorney, Agent, or Firm* — XSENSUS LLP

(57) ABSTRACT

An off-road vehicle includes a vehicle body frame, a cabin, a cargo bed, an engine room, an internal combustion engine, at least one heat generating object, and a fan. In the cabin, a passenger sheet supported by the vehicle body frame is provided. The cargo bed is supported by the vehicle body frame and provided behind the cabin. The cargo bed includes a front wall and a bottom wall. The engine room is provided behind the cabin, below the cargo bed, and ahead of the cargo bed. The internal combustion engine is provided in the engine room and supported by the vehicle body frame. The heat generating object is provided in the engine room and ahead of the cargo bed. The fan is provided in a space behind the cabin and ahead of the cargo bed, and is configured to send air toward the front wall of the cargo bed.

12 Claims, 9 Drawing Sheets

(56)        References Cited

U.S. PATENT DOCUMENTS

| | | | | |
|---|---|---|---|---|
| 11,181,080 B2 * | 11/2021 | Bouchard | .............. | B60K 13/02 |
| 11,293,540 B2 * | 4/2022 | Leclair | .................. | F16H 57/027 |
| 11,491,862 B2 * | 11/2022 | Nishiwaki | .............. | B60K 11/08 |
| 12,055,208 B2 * | 8/2024 | Leclair | ................. | F02M 35/024 |
| 12,122,228 B2 * | 10/2024 | Nelson | .................. | B60K 13/04 |
| 2004/0195019 A1 * | 10/2004 | Kato | ...................... | B60K 13/02 |
| | | | | 180/68.3 |
| 2006/0082191 A1 * | 4/2006 | McNulty | ............... | B62D 33/02 |
| | | | | 296/183.1 |
| 2018/0222311 A1 * | 8/2018 | Toupin | ............. | F02M 35/10157 |
| 2018/0264988 A1 * | 9/2018 | Johnson | ................ | B60P 7/0892 |
| 2018/0327038 A1 * | 11/2018 | Battaglini | ............ | B62D 61/065 |
| 2019/0078679 A1 * | 3/2019 | Leclair | .................. | B60K 13/02 |
| 2020/0080523 A1 * | 3/2020 | Driant | .................... | B01D 45/08 |
| 2020/0223495 A1 * | 7/2020 | Stibich | .................. | B62D 33/02 |
| 2022/0009340 A1 * | 1/2022 | Nishiwaki | .............. | B60K 11/04 |
| 2022/0316579 A1 * | 10/2022 | Leclair | ................. | F02M 35/024 |
| 2022/0356939 A1 | 11/2022 | Shimatani et al. | | |
| 2024/0132164 A1 * | 4/2024 | Dylewski | .............. | B62D 33/02 |
| 2024/0367504 A1 * | 11/2024 | Gilge | .................... | B60K 11/04 |

FOREIGN PATENT DOCUMENTS

| | | | | | |
|---|---|---|---|---|---|
| WO | WO-2012001791 A1 * | 1/2012 | ......... | B62D 25/2045 |
| WO | WO-2022113116 A1 * | 6/2022 | ............. | B62K 11/04 |

* cited by examiner

OFF-ROAD VEHICLE

BACKGROUND OF THE INVENTION

Field of the Invention

The present disclosure relates to an off-road vehicle including an internal combustion engine.

Description of the Related Art

US 2022/0356939 A1 discloses an off-road vehicle also referred to as a utility vehicle. In this off-road vehicle, an engine room is formed behind a passenger seat and under a cargo bed. In this engine room, the internal combustion engine and an exhaust pipe connected to the internal combustion engine are provided. In FIG. 12 of US 2022/0356939 A1, a heat exchanger is provided between the passenger seat and the cargo bed in a front-rear direction of the off-road vehicle. A fan and an outlet duct are mounted on the heat exchanger. The outlet duct is oriented to face the exhaust pipe so that air sent by the fan and discharged through the outlet duct cools the exhaust pipe.

In the off-road vehicle, there is room for improvement in effective utilization of air sent by the fan. Effective utilization of air sent by the fan, however, may lead to a reduction in degree of component layout freedom.

In view of the above-described circumstances, one embodiment of the present disclosure has an object to, without reducing degree of component layout freedom, effectively utilize air sent by a fan in an engine room.

SUMMARY

According to the one embodiment of the present disclosure, an off-road vehicle includes a vehicle body frame, a cabin, a cargo bed, an engine room, an internal combustion engine, at least one heat generating object, and a fan. In the cabin, a passenger sheet supported by the vehicle body frame is provided. The cargo bed is supported by the vehicle body frame and provided behind the cabin. The cargo bed includes a front wall and a bottom wall. The engine room is provided behind the cabin, below the cargo bed, and ahead of the cargo bed. The internal combustion engine is provided in the engine room and supported by the vehicle body frame. The at least one heat generating object is provided in the engine room and ahead of the cargo bed. The fan is provided in a space behind the cabin and ahead of the cargo bed, and is configured to send air toward the front wall of the cargo bed.

DETAILED DESCRIPTION

Figure 1:
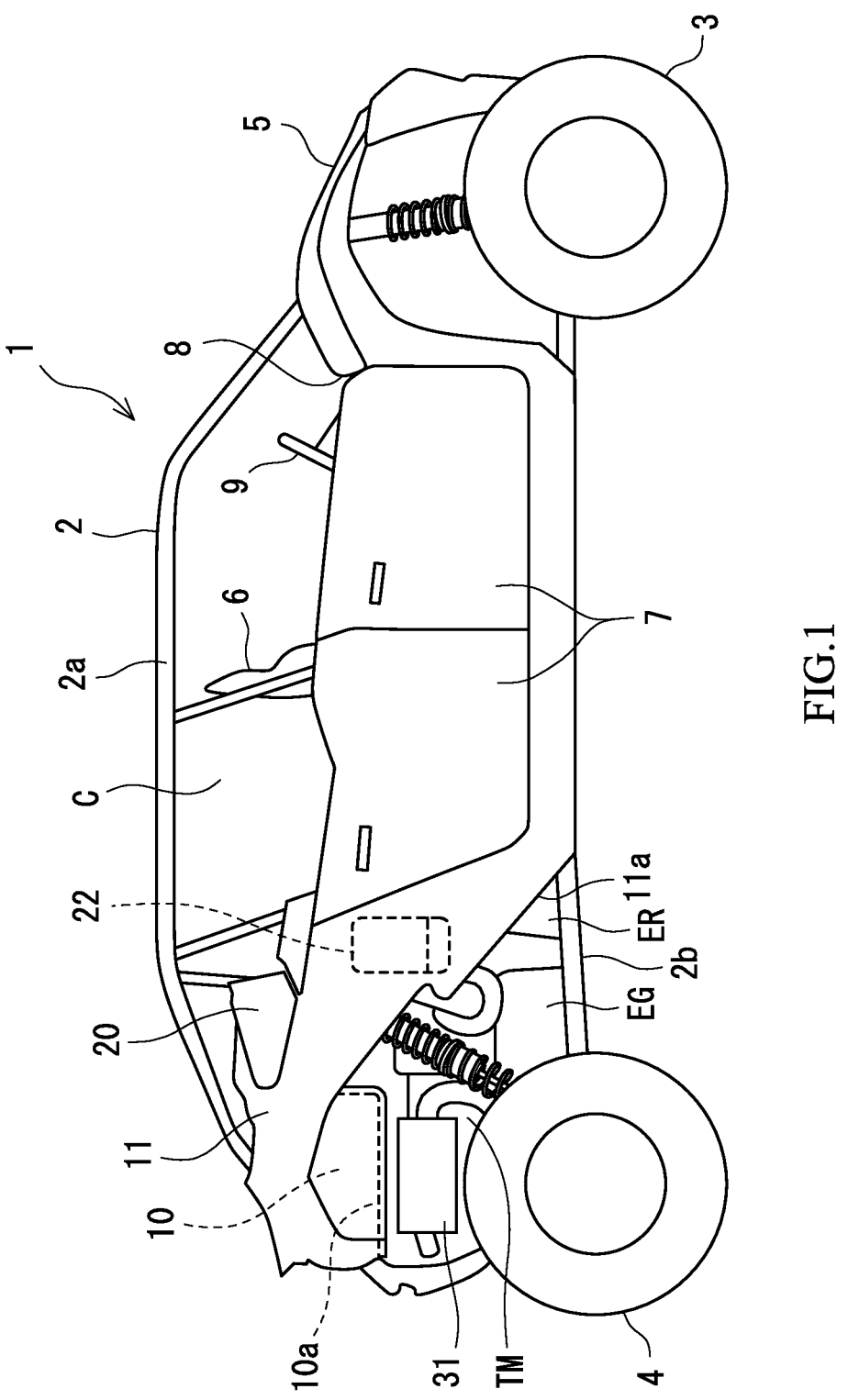
FIG. 1 is a right side view of an off-road vehicle according to an embodiment.

An embodiment will be described below by referring to the drawings. In the following description, directions are based on an off-road vehicle 1 unless otherwise defined individually. Specifically, a front-rear direction corresponds to a vehicle length direction of the off-road vehicle 1, and a right-left direction corresponds to a width direction of the off-road vehicle 1.

FIG. 1 is a right side view of the off-road vehicle 1 according to this embodiment. As illustrated in FIG. 1, the off-road vehicle 1 includes a vehicle body frame 2, a pair of right and left front wheels 3, and a pair of right and left rear wheels 4. The pair of front wheels 3 support a front portion of the vehicle body frame 2. The pair of rear wheels 4 support a rear portion of the vehicle body frame 2. The vehicle body frame 2 a pipe frame made up of a plurality of pipes connected to each other. The front wheels 3 and the rear wheels 4 each include a balloon tire for irregular ground travel purposes. There is a space between the right and left front wheels 3. The space is covered by a hood 5 from above the space.

A passenger sheet 6 is provided behind the hood 5. The passenger sheet 6 is supported by the vehicle body frame 2 and includes a driver sheet. The vehicle body frame 2 includes elements such as a cabin frame 2a. The cabin frame 2a surrounds a cabin C, where the passenger sheet 6 is provided. The cabin C is exposed to the outside. Side doors 7 are provided at one side of the cabin C. A dash panel 8 is provided in front of the driver sheet. A handle 9 is provided on the dash panel 8 and protrudes toward the driver sheet.

A cargo bed 10 is provided behind the cabin frame 2a. The cargo bed 10 is supported by a rear frame 2b of the vehicle body frame 2. The cargo bed 10 defines a storage space S. The storage space S has a depressed shape and is open to the outside. An engine room ER is provided behind the cabin frame 2a and under the cargo bed 10. The engine room ER is partially covered by a side cowl 11 outward in a width direction of the off-road vehicle 1. The side cowl 11 is supported by the rear frame 2b of the vehicle body frame 2.

In the engine room ER, an internal combustion engine EG and a continuously variable transmission TM are provided. The internal combustion engine EG includes a plurality of cylinders. The continuously variable transmission TM changes in speed the driving force output from the internal combustion engine EG. The internal combustion engine EG and the continuously variable transmission TM are supported by the rear frame 2b of the vehicle body frame 2. The internal combustion engine EG has an intake port connected to an intake assembly 13 and an exhaust port connected to an exhaust assembly 14. The intake assembly 13 includes an air cleaner 22. The air cleaner 22 is covered by the side cowl 11 at an outer side of the air cleaner 22 in the width direction of the off-road vehicle 1, and is hidden in a side view of the off-road vehicle 1. That is, the air cleaner 22 and the side cowl 11 overlap in a side view of the off-road vehicle 1. The side cowl 11 each have a cutout portion 11a. Through cutout portion 11a, the engine room ER is partially exposed outward in the width direction of the off-road vehicle 1.

Figure 2:
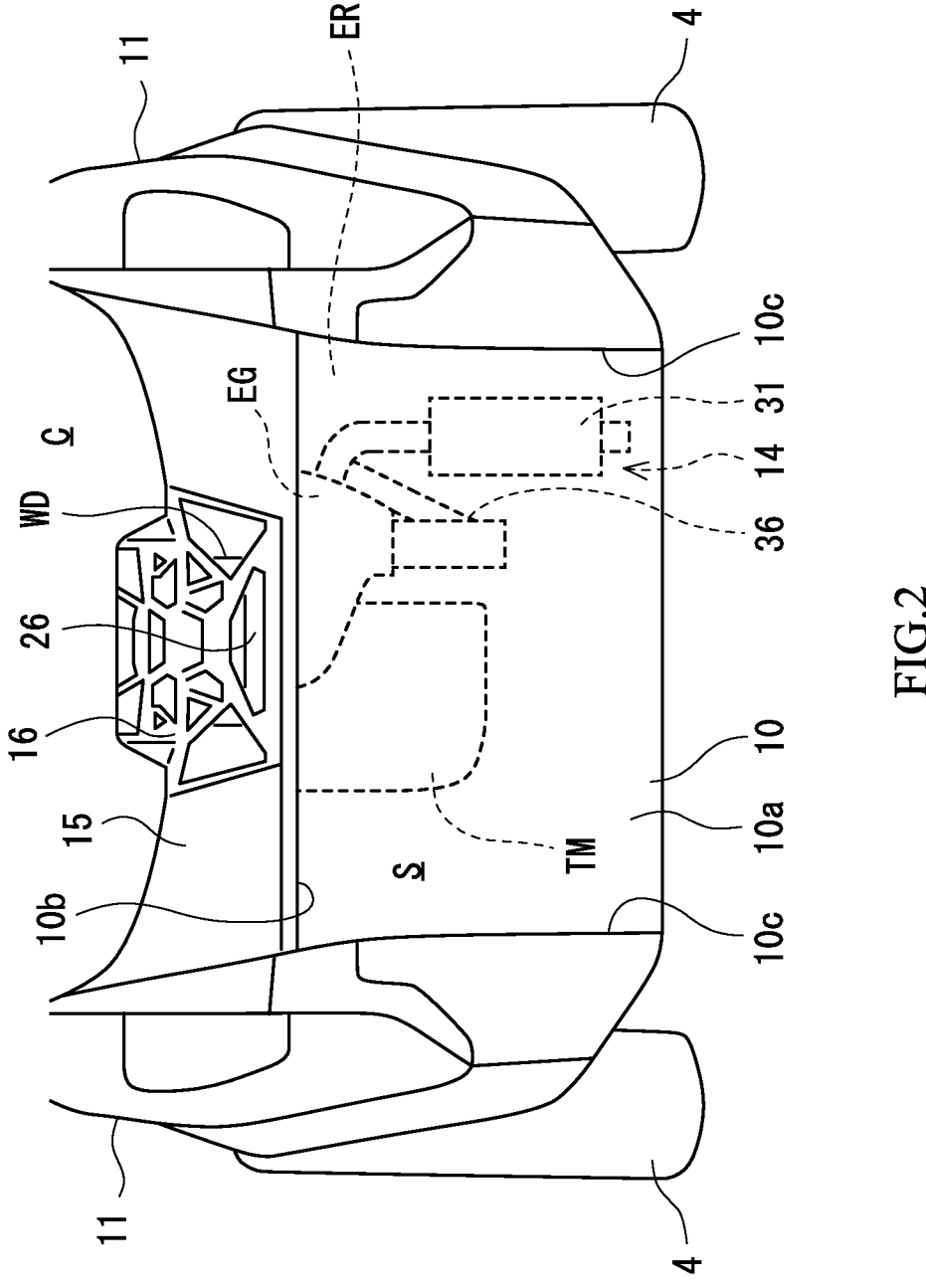
FIG. 2 is a top view of a rear portion of the off-road vehicle illustrated in FIG. 1.

FIG. 2 is a top view of a rear portion of the off-road vehicle 1 illustrated in FIG. 1. As illustrated in FIG. 2, the cargo bed 10 of the off-road vehicle 1 has a bottom wall 10*a*, a front wall 10*b*, and a pair of side walls 10*c*. The front wall 10*b* protrudes upward from a front side of the bottom wall 10*a*. One of the side walls 10*c* protrudes upward from a right side of the bottom wall 10*a*, and the other of the side walls 10*c* protrudes upward from a left side of the bottom wall 10*a*. That is, the storage space S of the cargo bed 10 is defined by the bottom wall 10*a*, the front wall 10*b*, and the pair of side walls 10*c*, and is open upward and rearward.

The engine room ER is covered by the cargo bed 10 and an engine room cover 15 from above the engine room ER. The engine room cover 15 is provided between the cabin C and the cargo bed 10 in the front-rear direction. The engine room cover 15 is provided over the internal combustion engine EG. The engine room cover 15 has a window opening WD. The window opening WD is open in a vertical direction. Through the window opening WD, an intercooler 26 is exposed. The intercooler 26 is provided in the engine room ER. A protection cover 16 is mounted on the engine room cover 15. The protection cover 16 covers the window opening WD from above the window opening WD.

The internal combustion engine EG and the continuously variable transmission TM overlap the engine room cover 15 and the bottom wall 10*a* of the cargo bed 10 in a top view of the off-road vehicle 1. The exhaust assembly 14 is provided immediately under the bottom wall 10*a* of the cargo bed 10. The exhaust assembly 14 includes an exhaust pipe 30 and a muffler 31. The exhaust assembly 14 is provided immediately under the bottom wall 10*a* of the cargo bed 10. The exhaust pipe 30 is connected to the exhaust port of the internal combustion engine EG. The muffler 31 is connected to the exhaust pipe 30.

Figure 3:
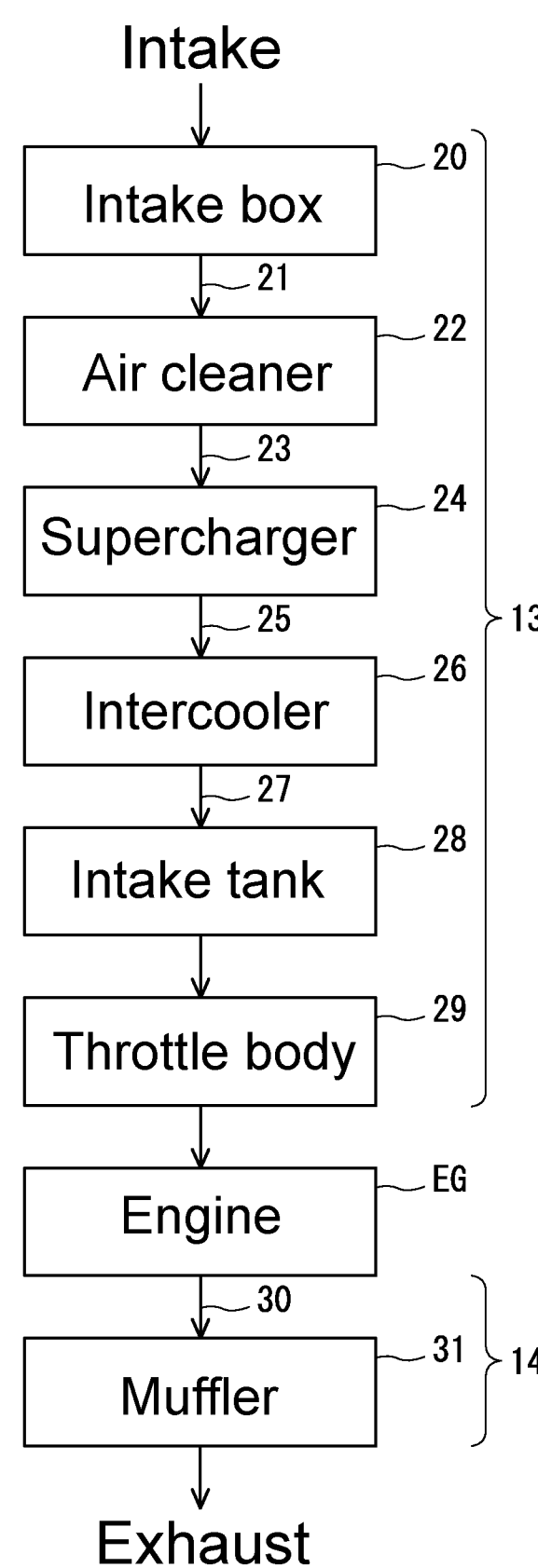
FIG. 3 is a block diagram of an intake system and an exhaust system of the off-road vehicle illustrated in FIG. 1.

FIG. 3 is a block diagram of the intake assembly 13 and the exhaust assembly 14, which serve for the internal combustion engine EG of the off-road vehicle 1 illustrated in FIG. 1. As illustrated in FIG. 3, the intake assembly 13 includes an intake box 20, a first intake duct 21, the air cleaner 22, a second intake duct 23, a supercharger 24, a third intake duct 25, the intercooler 26, a fourth intake duct 27, an intake tank 28, and a throttle body 29.

By causing negative pressure to occur at the intake port of the internal combustion engine EG, ambient air is absorbed into the intake box 20 as intake air. The intake air in the intake box 20 passes through the first intake duct 21, the air cleaner 22, the second intake duct 23, the supercharger 24, the third intake duct 25, the intercooler 26, the fourth intake duct 27, the intake tank 28, and the throttle body 29, in this order, and enters the intake port of the internal combustion engine EG through the throttle body 29.

The exhaust assembly 14 includes the exhaust pipe 30 and the muffler 31. The exhaust gas discharged through the exhaust port of the internal combustion engine EG passes through the exhaust pipe 30 and the muffler 31, in this order, and is discharged into ambient air through the muffler 31. It is to be noted that this configuration of exhaust assembly 14 is not intended in a limiting sense; for example, a plurality of mufflers may be used.

Figure 4:
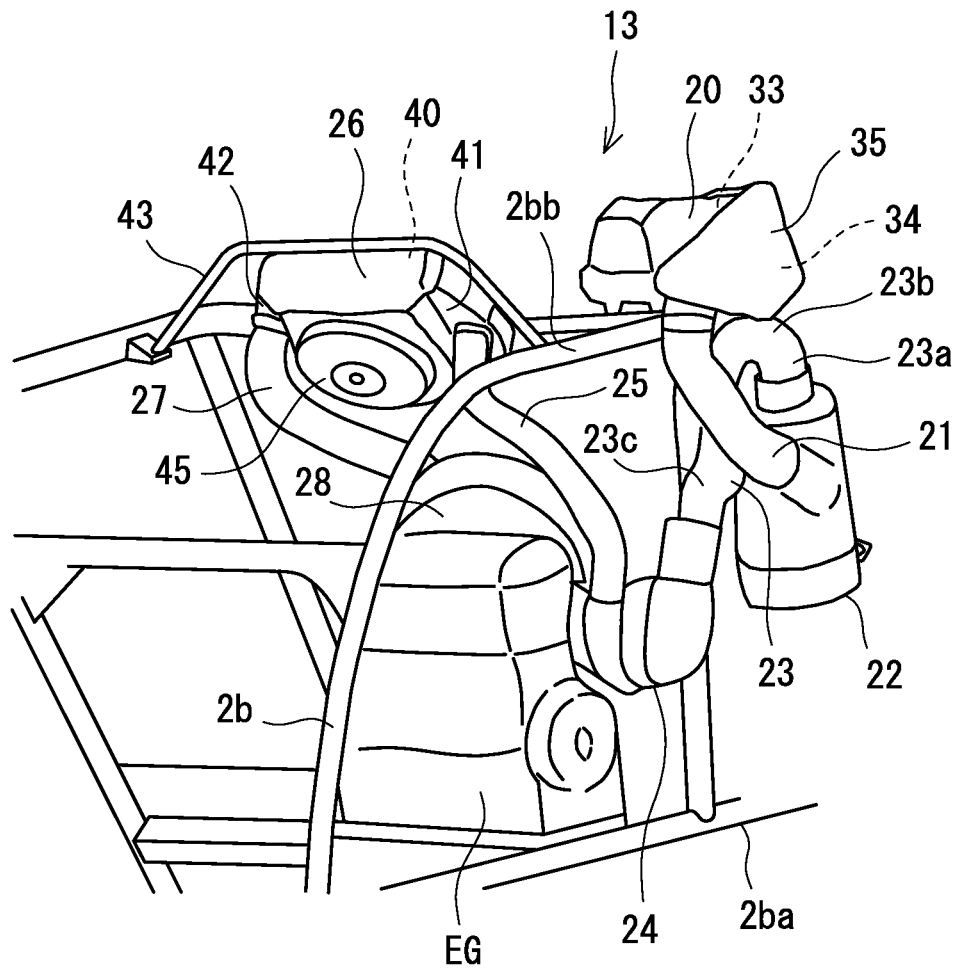
FIG. 4 is a diagonally right rear view of components, including an internal combustion engine, of the off-road vehicle illustrated in FIG. 1.
Figure 5:
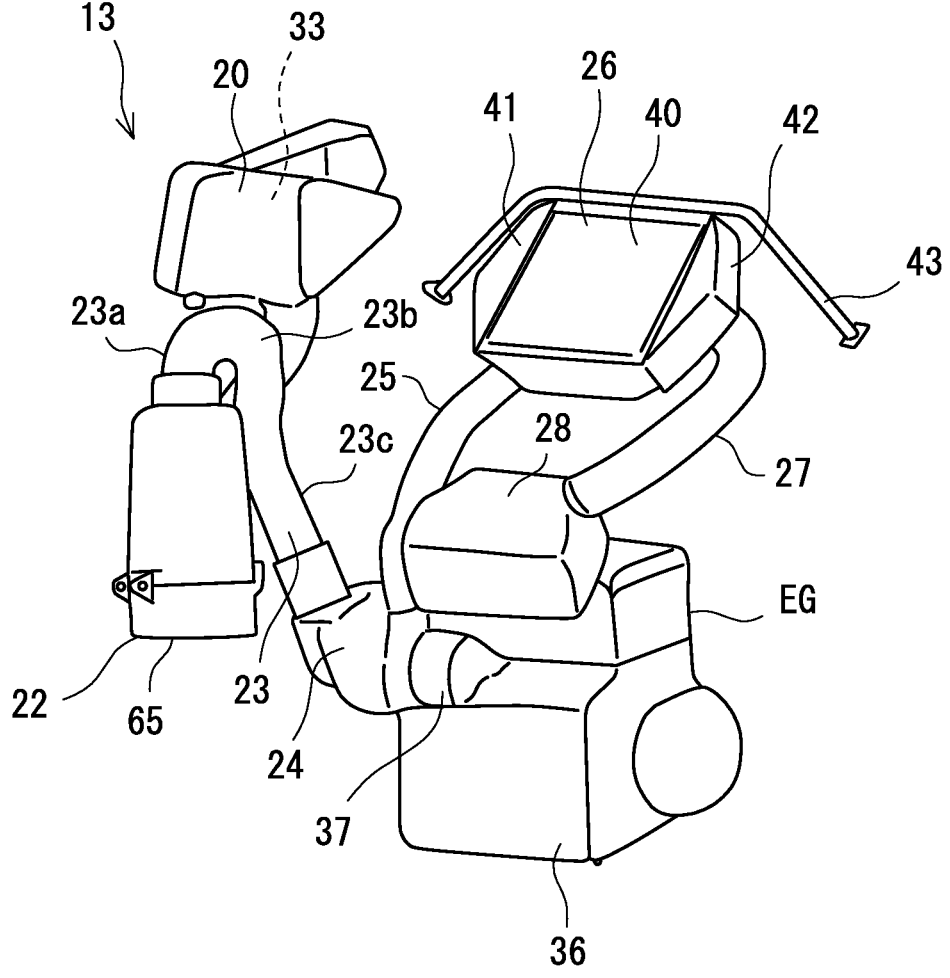
FIG. 5 is a diagonally left front view of the components, including the internal combustion engine, illustrated in FIG. 4.

FIG. 4 is a diagonally right rear view of components, including the internal combustion engine EG, of the off-road vehicle 1 illustrated in FIG. 1. FIG. 5 is a diagonally left front view of the components, including the internal combustion engine EG, illustrated in FIG. 4. As illustrated in FIGS. 4 and 5, the internal combustion engine EG and the intake assembly 13 are supported by the rear frame 2*b* of the vehicle body frame 2. The rear frame 2*b* includes a lower frame 2*ba* and an upper frame 2*bb*. The lower frame 2*ba* is provided above the upper frame 2*bb*.

The internal combustion engine EG is provided above the lower frame 2*ba* and below the upper frame 2*bb*. The intake box 20 and the intercooler 26 are provided at positions higher than the internal combustion engine EG. The intake box 20 and the intercooler 26 are provided at positions higher than the upper frame 2*bb*. The air cleaner 22 is provided at a position higher than the internal combustion engine EG. The intake box 20 is provided at a position higher than the air cleaner 22.

As illustrated in FIG. 1, the intake box 20 is provided at a position higher than the side doors 7. The intake box 20 is provided behind the cabin C and in front of the storage space S of the cargo bed 10. The air cleaner 22 is provided at a position higher than the rear wheels 4.

As illustrated in FIGS. 4 and 5, the internal combustion engine EG and the intercooler 26 are provided approximately at a center of the off-road vehicle 1 in its width direction. The intake box 20 and the air cleaner 22 are provided at one side of the off-road vehicle 1 in its width direction. For example, the intake box 20 and the air cleaner 22 are provided at the right side of the off-road vehicle 1. The intake box 20 and the air cleaner 22 are provided further outward than the rear frame 2*b* in the width direction of the off-road vehicle 1. The supercharger 24 is provided below the air cleaner 22. The supercharger 24 is provided at a height where the supercharger 24 and the internal combustion engine EG overlap. The supercharger 24 is provided at one side of the internal combustion engine EG and in front of the internal combustion engine EG.

The supercharger 24 is driven by, for example, motive power extracted from the internal combustion engine EG. A power transmission unit 37 is provided in a crankcase 36 of the internal combustion engine EG. The power transmission unit 37 contains a power transmission mechanism that is power-transmittably connected to a crank shaft in the crankcase 36 and that is connected to a drive shaft of the supercharger 24. With this configuration, the drive force of the crank shaft of the internal combustion engine EG is input to the supercharger 24 through the power transmission unit 37. The power transmission mechanism of the power transmission unit 37 may include at least one of a chain-sprocket mechanism, a gear mechanism, or a pulley-sprocket mechanism.

The intake box 20 has an internal space 33. The intake box 20 has an internal space 33. The intake box 20 has an opening 34. The internal space 33 communicates with the outside of the off-road vehicle 1 through the opening 34. The opening 34 of the intake box 20 are covered by a filter 35. The intake box 20 is connected to the air cleaner 22 via the first intake duct 21. The air cleaner 22 is connected to the supercharger 24 via the second intake duct 23.

The second intake duct 23 is provided at a height included in the height range of the first intake duct 21. The second intake duct 23 includes a first portion 23*a*, a second portion 23*b*, and a third portion 23*c*. The first portion 23*a* of the second intake duct 23 protrudes upward from the air cleaner 22. The second portion 23*b* of the second intake duct 23 is curved downward from the first portion 23*a*. That is, the second portion 23*b* has an inversed U shape. The third portion 23*c* extends toward the supercharger 24 from the second portion 23*b*. This configuration ensures that the air cleaner 22, which is provided above the supercharger 24, can be provided near the supercharger 24 in a horizontal direction, increasing the degree of layout freedom in the interior of the off-road vehicle 1.

The supercharger 24 is connected to the intercooler 26 via the third intake duct 25. The intercooler 26 is provided along an intake conduit extending from the supercharger 24 toward the internal combustion engine EG, and is provided above the internal combustion engine EG. The intercooler 26 includes an intercooler core 40, an inlet tank 41, and an outlet tank 42. The intercooler core 40 has an upper surface that faces diagonally upward. The intercooler 26 is supported by the upper frame 2*bb* of the rear frame 2*b* via a bracket 43. The third intake duct 25 is connected to the inlet tank 41 of the intercooler 26. The outlet tank 42 of the intercooler 26 is connected to the intake tank 28 via the fourth intake duct 27.

The inlet tank 41 is provided at one side of the intercooler core 40 in the width direction of the off-road vehicle 1, and is fluidally connected to the intercooler core 40. The outlet tank 42 is provided at the other side of the intercooler core 40 in the width direction of the off-road vehicle 1, and is fluidally connected to the intercooler core 40. A fan 45 abuts on a rear surface of the intercooler core 40. the rear surface of the intercooler core 40 faces diagonally downward. An example of the fan 45 is an electric fan, which is driven by a motor. By driving the fan 45, ambient air passes through the intercooler core 40 from an upper surface to a lower surface of the intercooler core 40.

Air from the supercharger 24 flows through the third intake duct 25 and enters the inlet tank 41. The air inside the inlet tank 41 flows into the intercooler core 40. The air flows through the intercooler core 40 and flows into the outlet tank 42. The air flowing inside the intercooler core 40 is cooled by heat exchange with ambient air. That is, the intercooler 26 is a heat exchanger that uses ambient air to cool intake air flowing through the inside of the intercooler 26. This configuration ensures that the air heated at the supercharger 24 is cooled at the intercooler 26, and the cooled air is supplied to the internal combustion engine EG. As a result, intake charging efficiency improves in the internal combustion engine EG.

Figure 6:
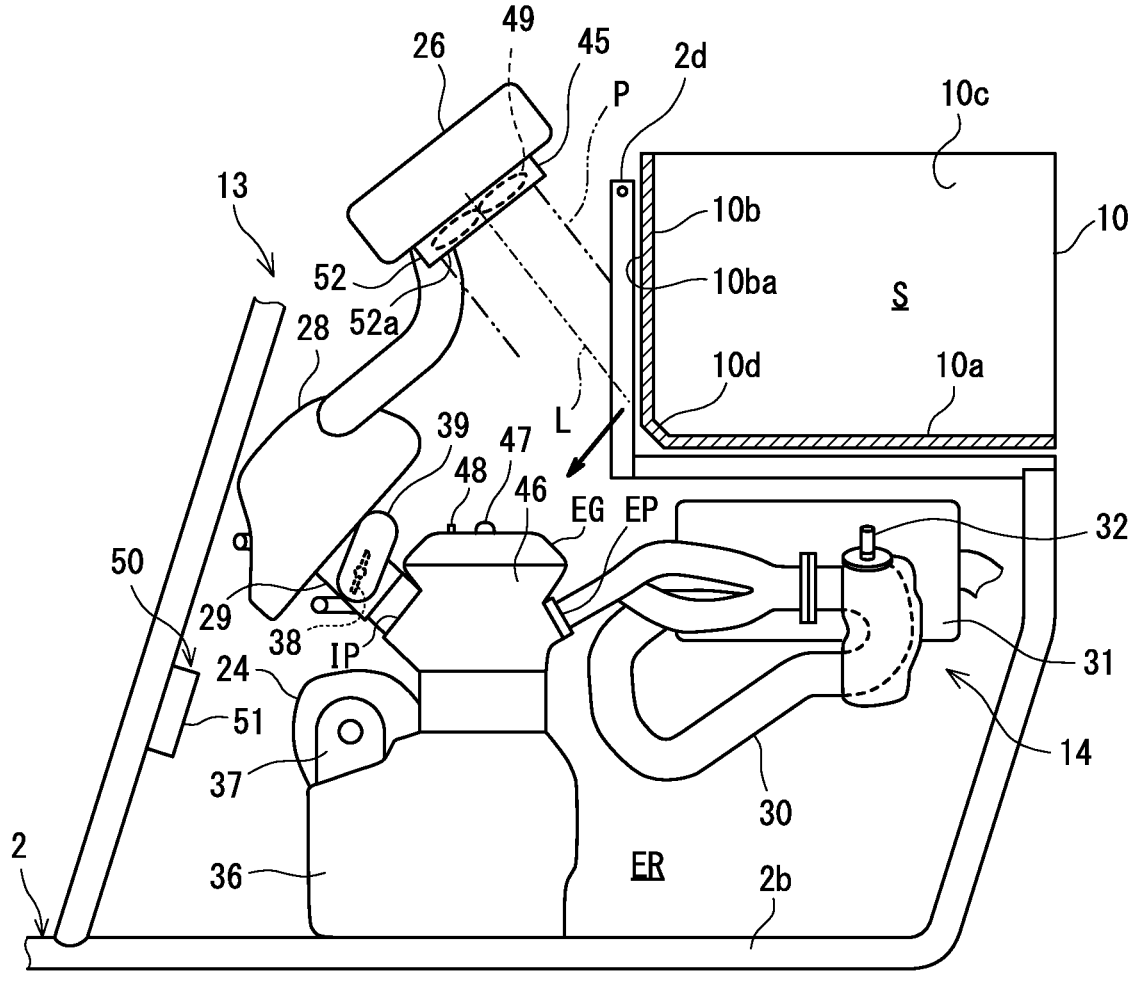
FIG. 6 is a left side view of the components, including a fan and a cargo bed, illustrated in FIG. 5.

FIG. 6 is a left side view of the components, including the fan 45 and the cargo bed 10, illustrated in FIG. 5. As illustrated in FIG. 6, the internal combustion engine EG includes the crankcase 36 and a cylinder 46. The cylinder 46 protrudes upward from the crankcase 36. The cylinder 46 includes an intake port IP and an exhaust port EP. At an upper portion of the cylinder 46, an ignition plug 47 and a cam angle sensor 48 are provided. The intake port IP is provided ahead of the internal combustion engine EG. The exhaust port EP is provided behind the internal combustion engine EG.

The throttle body 29 is connected to the intake port IP of the internal combustion engine EG. The throttle body 29 is provided with an electric motor 39. The electric motor 39 drives a throttle valve 38. The intake tank 28 is connected to the throttle body 29. The intake tank 28 defines an intake chamber. The intake chamber communicates with an intake conduit of the throttle body 29.

The intake tank 28 is provided above the throttle body 29. The intake tank 28 is provided immediately above the supercharger 24 in a side view of the off-road vehicle 1. The intercooler 26 is provided above the intake tank 28. The intercooler 26, the intake tank 28, and the throttle body 29 overlap in position in the front-rear direction of the off-road vehicle 1. This overlap configuration ensures that the apparatuses and/or devices associated with the internal combustion engine EG are provided in a compact arrangement in the front-rear direction of the off-road vehicle 1, increasing the degree of layout freedom in the off-road vehicle 1.

The exhaust pipe 30 is connected to the exhaust port EP of the internal combustion engine EG. The muffler 31 is connected to the exhaust pipe 30. The exhaust assembly 14, which includes the exhaust pipe 30 and the muffler 31, is provided behind the internal combustion engine EG and immediately under the cargo bed 10. An oxygen sensor 32 is mounted on the exhaust pipe 30. The oxygen sensor 32 includes a detection device exposed to an conduit of the exhaust pipe 30 to detect the oxygen concentration of the exhaust gas from the internal combustion engine EG. The oxygen sensor 32 is mounted on an upper portion of the exhaust pipe 30, and protrudes upward from the exhaust pipe 30 to face the cargo bed 10.

The vehicle body frame 2 includes a cargo bed support frame 2*d*. The cargo bed support frame 2*d* is connected to the rear frame 2*b*. The cargo bed 10 is supported by the cargo bed support frame 2*d*. The fan 45 is provided on the rear surface of the intercooler 26. An example of the fan 45 is an axial fan. The fan 45 includes an impeller 49. The impeller 49 is contained in a housing 52 and rotates about a predetermined rotation axis. Air sent from the impeller 49 is discharged through a discharge opening 52*a*. The discharge opening 52*a* is provided on the rear surface of the housing 52. The impeller 49 has a rotation axis extending diagonally downward. The fan 45 is provided at a position higher than the bottom wall 10*a* of the cargo bed 10. The fan 45 overlaps with the cargo bed 10 in the front-rear direction of the off-road vehicle 1 (see FIG. 9). The fan 45 directly faces the cargo bed 10.

The fan 45 is provided to send air toward the front wall 10*b* of the cargo bed 10. The fan 45 sends air rearward and downward (that is, diagonally) toward the front wall 10*b* of the cargo bed 10. Specifically, an imaginary extension line L extends diagonally downward from the rotation axis of the impeller 49. The imaginary extension line L crosses the front wall 10*b* of the cargo bed 10. The imaginary extension line L of the rotation axis of the impeller 49 extends in parallel with the front-rear direction of the off-road vehicle 1 in a plan view of the off-road vehicle 1. An air sending direction in which the fan 45 sends air coincides with the imaginary extension line L of the rotation axis of the fan 45.

An imaginary projection region P is obtained by projecting the discharge opening 52*a* of the fan 45 in the air sending direction. Apart of imaginary projection region P is oriented toward the front wall 10*b* of the cargo bed 10. An other part of the imaginary projection region P (which is obtained by projecting the discharge opening 52*a* of the fan 45 in the air sending direction) is oriented toward a space immediately under the front wall 10*b* of the cargo bed 10. In the fan 45 according to this embodiment, an imaginary circle passing along the radially outer circumference of the impeller 49 is projected in the air sending direction and in parallel with the imaginary extension line L to obtain an imaginary projection region. Apart of this imaginary projection region is oriented toward the front wall 10*b* of the cargo bed 10. An other part of the imaginary projection region P (which is obtained by projecting the imaginary circle in the air sending direction and in parallel with the imaginary extension line L) is oriented toward a space immediately under the front wall 10*b* of the cargo bed 10.

In the fan 45 according to this embodiment, a front-lower corner of the cargo bed 10 is chamfered. In other words, the cargo bed 10 includes a tapered wall 10*d*. The tapered wall 10*d* connects the bottom wall 10*a* and the front wall 10*b* to each other. The tapered wall 10*d* extends diagonally upward from a front edge of the bottom wall 10*a* toward a lower edge of the front wall 10*b*.

The internal combustion engine EG is provided in the engine room ER and ahead of and below the cargo bed 10.

A heat generating object 50 is provided in the engine room ER and ahead of and below the cargo bed 10. The heat generating object 50 may be an electrical component that generates heat in operation due to current passing through the electrical component. In a case where the heat generating object 50 is an electrical component, the heat generating object 50 may be an ignition device 47. The ignition device 47 includes components including an ignition plug, a cap, and a coil. In a case where the heat generating object 50 is an electrical component, the heat generating object 50 may be an electric motor. The electric motor may be the electric motor 39 for the throttle body 29, or may be a starter motor to start the internal combustion engine EG. In a case where the heat generating object 50 is an electrical component, the heat generating object 50 may be a sensor. The sensor may be at least one of the cam angle sensor 48, an intake pressure sensor, a knocking sensor, a falling sensor, and a rotation speed sensor. In a case where the heat generating object 50 is an electrical component, the heat generating object 50 may be an electric regulator 51. The electric regulator 51 adjusts the voltage of the electricity supplied to the electrical component from a battery. The ignition device 47 is an example of a first electrical component provided in the internal combustion engine EG. The electric motor 39 and the electric regulator 51 are examples of a second electrical component shifted from the internal combustion engine EG in the right-left direction of the off-road vehicle 1. The heat generating object 50 may be the cylinder 46 of the internal combustion engine EG.

Figure 7:
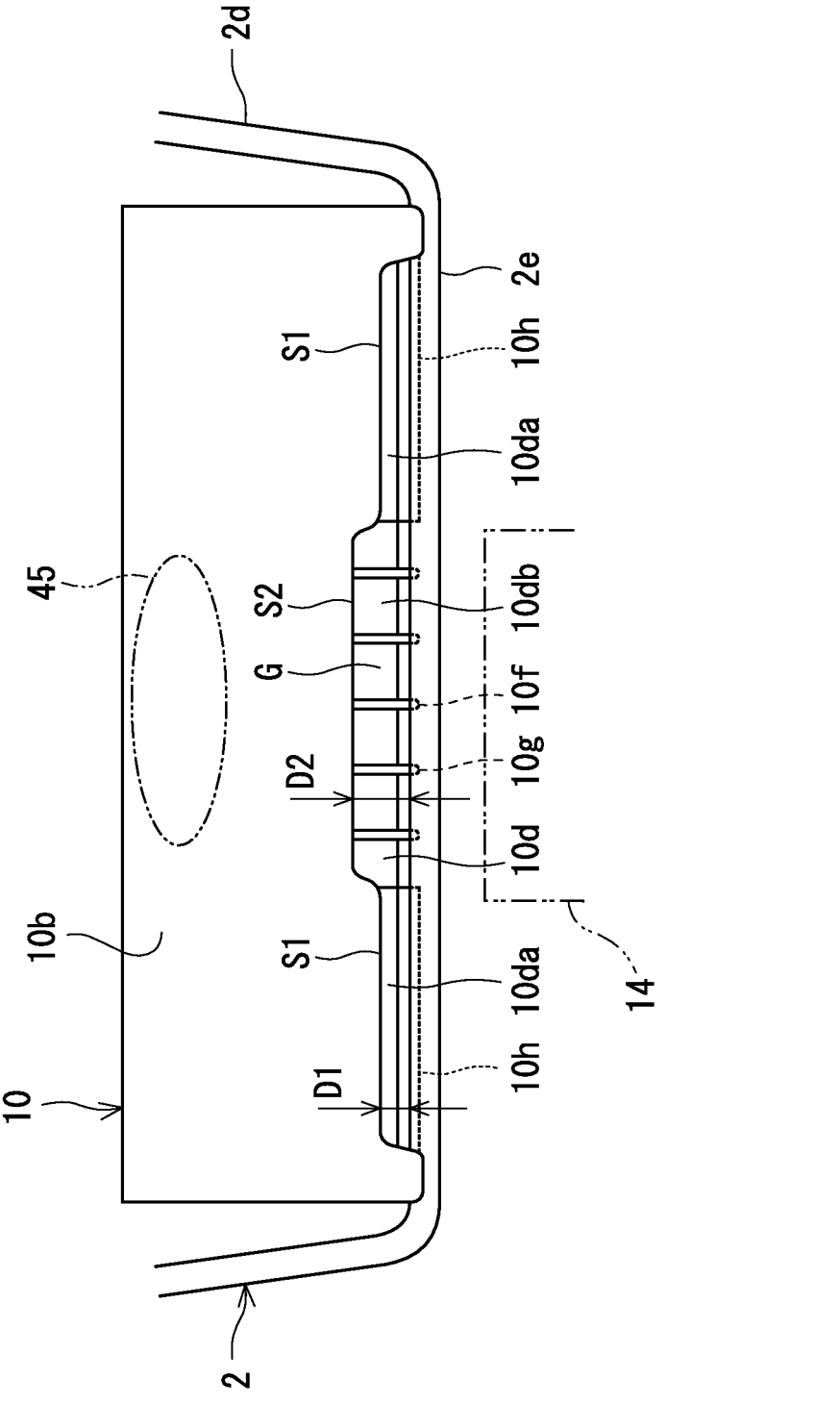
FIG. 7 is a front view of the cargo bed illustrated in FIG. 6.

FIG. 7 is a front view of the cargo bed 10 illustrated in FIG. 6. As illustrated in FIG. 7, the cargo bed support frame 2d of the vehicle body frame 2 includes a cross-frame 2e. The cross-frame 2e extends in the right-left direction of the off-road vehicle 1 along the lower edge of the front wall 10b of the cargo bed 10. A gap G is defined between the cross-frame 2e and the lower edge of the front wall 10b of the cargo bed 10.

The lower edge of the front wall 10b of the cargo bed 10 includes a pair of first portions S1 and a second portion S2. The pair of first portions S1 are shifted outward from the fan 45 and the exhaust assembly 14 in the right-left direction of the off-road vehicle 1. The second portion S2 is aligned with the fan 45 and the exhaust assembly 14 in the right-left direction of the off-road vehicle 1. The second portion S2 is provided between the pair of first portions S1 in the front-rear direction of the off-road vehicle 1. The second portion S2 is provided at a center of the cargo bed 10 in the right-left direction of the off-road vehicle 1. One of the first portions S1 is provided at a right position of the cargo bed 10 in the right-left direction of the off-road vehicle 1, and the other of the first portions S1 is provided at a left position of the cargo bed 10 in the right-left direction of the off-road vehicle 1.

The second portion S2 of the lower edge of the front wall 10b is higher in position than the first portions S1 of the lower edge of the front wall 10b. In the gap G, a distance D2 between the second portion S2 and the cross-frame 2e is larger than a distance D1 between the first portions S1 and the cross-frame 2e. The tapered wall 10d of the cargo bed 10 includes first tapered walls 10da and a second tapered wall 10db. The first tapered walls 10da abut on the respective first portions S1. The second tapered wall 10db abuts on the second portion S2. In a front view of the cargo bed 10, the dimension of the second tapered wall 10db in an upper-lower direction of the off-road vehicle 1 is larger than the dimension of the first tapered walls 10da in the upper-lower direction of the off-road vehicle 1.

Figure 8:
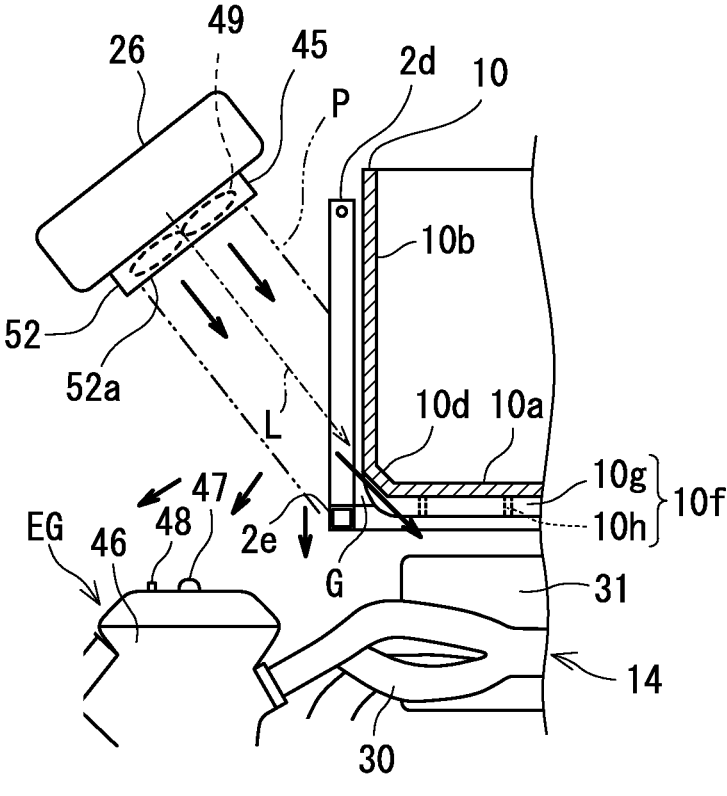
FIG. 8 is a partially enlarged view of FIG. 6.

FIG. 8 is a partially enlarged view of FIG. 6. As illustrated in FIG. 8, air sent from the fan 45 collides with, is reflected by, and is diffused by the front surface of the front wall 10b of the cargo bed 10. Then, this air cools the heat generating object 50 (see FIG. 6), which is located below and ahead of the cargo bed 10. The fan 45 faces the exhaust assembly 14 through the gap G between the cross-frame 2e and the lower edge of the front wall 10b of the cargo bed 10. Apart of the imaginary projection region P of the discharge opening of the fan 45 passes through the gap G toward the exhaust assembly 14. Part of the air sent from the fan 45 passes through the gap G along the tapered wall 10d and cools the exhaust assembly 14. It should be particularly noted that since there is a large distance D2 between the cross-frame 2e and the second portion S2 of the lower edge of the front wall 10b (see FIG. 7), part of the air sent from the fan 45 is more likely to pass through the gap G toward the exhaust assembly 14.

As illustrated in FIGS. 7 and 8, the cargo bed 10 includes a reinforcing rib group 10f. The reinforcing rib group 10f protrudes downward from a lower surface of the bottom wall 10a. The reinforcing rib group 10f includes first ribs 10g and second ribs 10h. The first ribs 10g extend in the front-rear direction of the off-road vehicle 1 and are provided at intervals in the right-left direction of the off-road vehicle 1. The second ribs 10h extend in the right-left direction of the off-road vehicle 1 and are provided at intervals in the front-rear direction of the off-road vehicle 1.

In the regions corresponding to the first portions S1 of the cargo bed 10 in the right-left direction of the off-road vehicle 1, the first ribs 10g and the second ribs 10h are provided at the lower surface of the bottom wall 10a. The first ribs 10g and the second ribs 10h, however, are not provided at lower surfaces of the first tapered walls 10da. With this configuration, the air flowing diagonally downward along the first tapered walls 10da is not blocked by the reinforcing rib group 10f immediately under the first tapered walls 10da.

In the region corresponding to the second portion S2 of the cargo bed 10 in the right-left direction of the off-road vehicle 1, the first ribs 10g extend between the lower surface of the bottom wall 10a and a lower surface of the second tapered wall 10db. The second ribs 10h are not provided at the second tapered wall 10db. That is, the spaces defined between first ribs 10g immediately under the second tapered wall 10db are open spaces that are open in the front-rear direction of the off-road vehicle 1. With this configuration, the air flowing diagonally downward along the second tapered wall 10db is not blocked by second ribs 10h immediately under the second tapered wall 10db.

Figure 9:
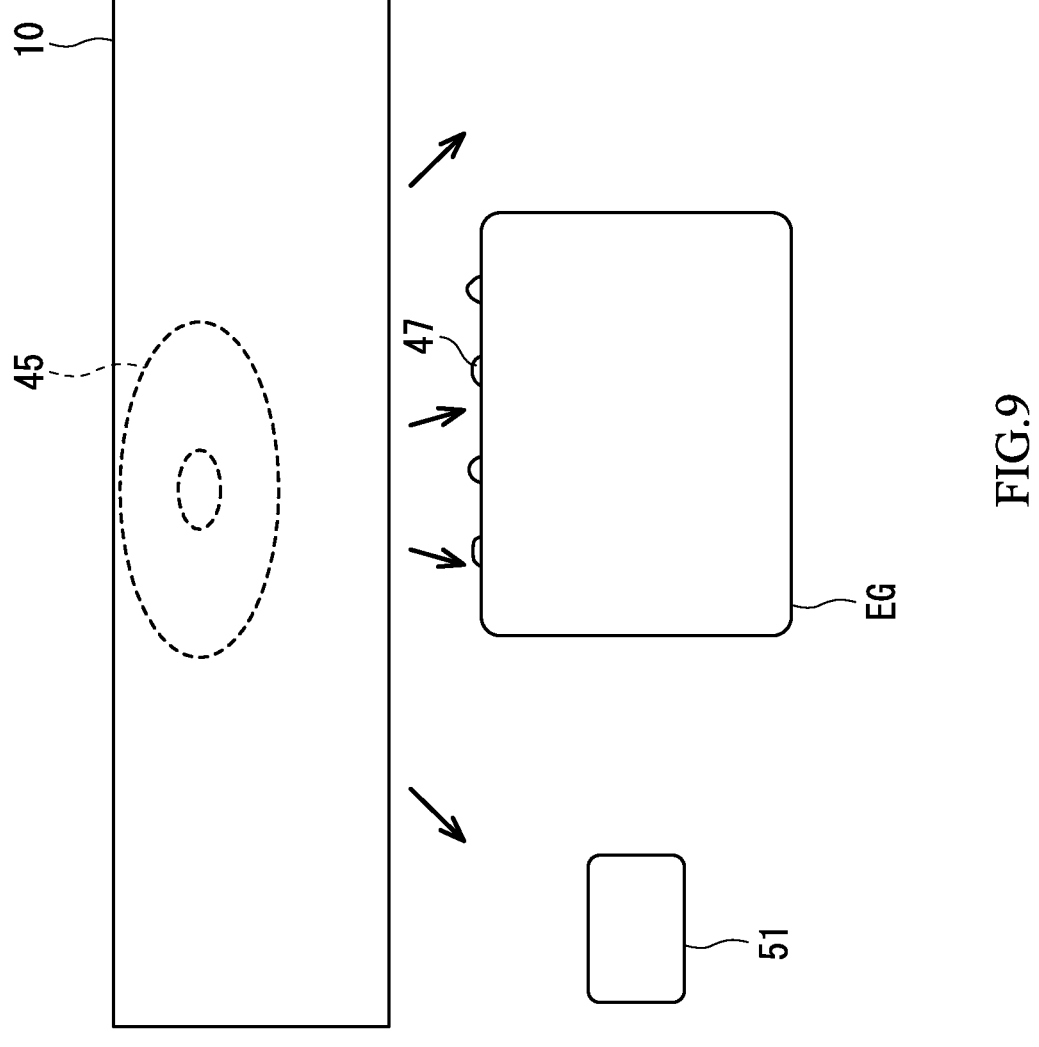
FIG. 9 is a rear side view of the fan and an electric regulator illustrated in FIG. 6.

FIG. 9 is a rear side view of the fan 45 and the electric regulator 51 illustrated in FIG. 6. As illustrated in FIG. 9, the electric regulator 51 (also see FIG. 6) is provided ahead of the internal combustion engine EG. The electric regulator 51, at least one ignition device 47, and sensors including the cam angle sensor 48 are shifted from the fan 45 in the right-left direction of the off-road vehicle 1. The electric regulator 51 is shifted from the internal combustion engine EG in the right-left direction of the off-road vehicle 1.

The air sent from the fan 45 collides with and is reflected by the front wall 10b of the cargo bed 10 (see FIG. 6), and as viewed from the fan 45, is diffused outward in the right-left direction of the off-road vehicle 1 as well. With this configuration, the air collides with and is bounced back by the front wall 10b of the cargo bed 10, and then reaches the electric regulator 51, the ignition device 47, and the sensors, which are shifted from the fan 45 in the right-left direction of the off-road vehicle. Also, since the electrical components including the electric regulator 51 are shifted from the internal combustion engine EG in the right-left direction of the off-road vehicle 1, the air colliding with and bounced back by the front wall 10*b* of the cargo bed 10 is more likely to reach the electrical components including the electric regulator 51, without being blocked by the internal combustion engine EG.

As has been described hereinbefore, the fan 45 is provided in the space behind the cabin C and ahead of the cargo bed 10, and sends air toward the front wall 10*b* of the cargo bed 10. With this configuration, the air sent from the fan 45 is bounced back and diffused by the front surface of the front wall 10*b* of the cargo bed 10, and reaches the heat generating object 50, which is provided ahead of the cargo bed 10. This ensures that the heat generating object 50 (which is provided in the engine room ER and ahead of the cargo bed 10) is effectively cooled. As a result, the air sent from the fan 45 can be effectively used in the engine room ER, without reducing degree of component layout freedom.

At least a part of the fan 45 is provided at a position higher than the bottom wall 10*a* of the cargo bed 10. With this configuration, when the air sent from the fan 45 is bounced back by the front surface of the front wall 10*b* of the cargo bed 10, the air is more likely to flow frontward and downward. This ensures that the heat generating object 50 (which is provided ahead of the cargo bed 10 and below the cargo bed 10) is effectively cooled.

Even though the electric regulator 51 (which is a heat generating object 50) is shifted from the fan 45, the air sent from the fan 45 collides with the front surface of the front wall 10*b* of the cargo bed 10 and diffused in the right-left direction of the off-road vehicle 1 as well. This ensures that the electric regulator 51 is also cooled.

The fan 45 is provided to send air rearward and downward (that is, diagonally) toward the front wall 10*b* of the cargo bed 10. With this configuration, the air sent from the fan 45 is bounced back by the front wall 10*b* of the cargo bed 10 and effectively cools the heat generating object 50, which is provided ahead of the cargo bed 10 and below the cargo bed 10.

A part of the imaginary projection region P (which is obtained by projecting the discharge opening of the fan 45 in the air sending direction) is oriented toward the front wall 10*b* of the cargo bed 10. An other part of the imaginary projection region P is oriented toward the space immediately under the front wall 10*b* of the cargo bed 10. With this configuration, both the heat generating object 50 (which is provided below and ahead of the cargo bed 10) and the exhaust assembly 14 (which is provided immediately under the cargo bed 10) are effectively cooled.

The heat generating object 50 is provided ahead of the cargo bed 10 and below the cargo bed 10, and the fan 45 sends air rearward and downward (that is, diagonally) to the front wall 10*b* of the cargo bed 10. With this configuration, the air sent from the fan 45 is bounced back by the front wall 10*b* of the cargo bed 10 and flows frontward and downward. For example, the air bounced back by the front wall 10*b* of the cargo bed 10 and flowing frontward and downward reaches the ignition plug 47 for the internal combustion engine EG, the throttle body 29 of the electric motor 39 (which is provided in the internal combustion engine EG), and the cam angle sensor 48 of the internal combustion engine EG. This ensures that the heat generating object 50 (which is provided ahead of the cargo bed 10 and below the cargo bed 10) is effectively cooled.

The electric regulator 51 is provided ahead of the internal combustion engine EG and shifted from the fan 45 in the right-left direction of the off-road vehicle 1. Even in this configuration, the air sent from the fan 45 collides with the front wall 10*b* of the cargo bed 10 and is diffused in the right-left direction of the off-road vehicle 1. As a result, the air reaches the electric regulator 51 as well. Also, the electric regulator 51 is shifted from the internal combustion engine EG in the right-left direction of the off-road vehicle 1. This ensures that even though the electric regulator 51 is provided ahead of the internal combustion engine EG, air colliding with and bounced back by the front wall 10*b* of the cargo bed 10 reaches the electric regulator 51.

The imaginary extension line L of the rotation axis of the impeller 49 of the fan 45, which is an axial fan, crosses the front wall 10*b* of the cargo bed 10. With this configuration, the air sent from the fan 45 stably collides with the front surface of the front wall 10*b* of the cargo bed 10 and is effectively diffused.

There is the gap G between the cross-frame 2*e* and the lower edge of the front wall 10*b* of the cargo bed 10, and the fan 45 faces the exhaust assembly 14 through the gap G. With this configuration, the air sent from the fan 45 reaches the exhaust assembly 14 through the gap G. This ensures that not only the heat generating object 50 (which is provided ahead of the cargo bed 10) but also the exhaust assembly 14 are effectively cooled, even in a case where the fan 45 is provided ahead of the cargo bed 10 and provided at a position higher than the bottom wall 10*a* of the cargo bed 10 and where the exhaust assembly 14 is provided immediately under the cargo bed 10.

The distance D2 between the cross-frame 2*e* and the second portion S2 of the lower edge of the front wall 10*b* of the cargo bed 10 in the gap G is larger than the distance D1 between the cross-frame 2*e* and the first portions S1 of the lower edge of the front wall 10*b* of the cargo bed 10 in the gap G. With this configuration, the air sent from the fan 45 is more likely to pass through the gap G between the cross-frame 2*e* and the lower edge of the front wall 10*b* of the cargo bed 10. As a result, the exhaust assembly 14 is effectively cooled by the fan 45.

The front-lower corner of the cargo bed 10 is chamfered into the tapered wall 10*d*. With this configuration, the gap G is kept wide while keeping the bottom wall 10*a* of the cargo bed 10 low in position. Also in this configuration, when the air sent from the fan 45 passes through the gap G, the air is caused to flow smoothly along the tapered wall 10*d* toward the exhaust assembly 14.

In the region corresponding to the second portion S2 of the cargo bed 10 in the right-left direction of the off-road vehicle 1, the first ribs 10*g* extend between the lower surface of the bottom wall 10*a* and the lower surface of the second tapered wall 10*db*, and the second ribs 10*h* are not provided at the tapered wall 10*db*. With this configuration, when the air sent from the fan 45 flows along the second tapered wall 10*db* of the cargo bed 10 toward the exhaust assembly 14, the air is not blocked by the second ribs 10*h*, which extend in the right-left direction of the off-road vehicle 1. This ensures that the air sent from the fan 45 flows along the tapered wall 10*db* and smoothly reaches the exhaust assembly 14 while increasing the strength of the cargo bed 10.

The fan 45 is provided on the rear surface of the intercooler 26. With this configuration, the fan 45, which is dedicated to the intercooler 26, can be shared by the heat generating object 50 and the exhaust assembly 14 for cooling purposes. As a result, an increase in piece-part count is prevented.

The air sent from the fan 45 reaches electrical components including the electric motor 39, the ignition plug 47, the cam angle sensor 48, and the electric regulator 51. With this configuration, heat generating electrical components are effectively cooled.

It will be appreciated that the present disclosure will not be limited to the above-described embodiment. For example, the fan may include a jetting duct connected to the housing of the impeller, and the discharge opening of the jetting duct may be used as a discharge opening of the fan. The fan may be a centrifugal fan. In this case as well, the discharge opening of the housing of the impeller or the discharge opening of a jetting duct connected to the housing may be used as a discharge opening of the fan.

An entirety of the imaginary projection region P (which is obtained by projecting the discharge opening 52a of the fan 45 in the air sending direction) may be oriented toward the front wall 10b of the cargo bed 10. The imaginary extension line L of the rotation axis of the impeller 49 of the fan 45 may pass through the space immediately under the front wall 10b of the cargo bed 10. The fan 45 may be a single fan, instead of also serving as a forced-air cooling fan for the intercooler 26.

While the present disclosure has been described in connection with embodiments, it will be understood that the above-described embodiments will not be intended in a limiting sense and that omissions, substitutions, additions, and/or alterations may be made to the embodiments. It will also be understood that the components and/or configurations described in the embodiments may be combined to form a new embodiment. For example, one or some of the configurations described in the embodiments may be isolated from the rest of the configurations in any manner deemed suitable. It will further be understood that the components and/or configurations described in the accompanying drawings and detailed description not only include those components and/or configurations essential for problem solving purposes but also include those components and/or configurations inessential for problem solving purposes.

What is claimed is:

1. An off-road vehicle comprising:
a vehicle body frame;
a cabin in which a passenger seat supported by the vehicle body frame is provided;
a cargo bed supported by the vehicle body frame and provided behind the cabin, the cargo bed including a front wall and a bottom wall;
an engine room provided behind the cabin, below the cargo bed, and ahead of the cargo bed;
an internal combustion engine provided in the engine room and supported by the vehicle body frame;
at least one heat generating object provided in the engine room and ahead of the cargo bed; and
a fan provided in a space behind the cabin and ahead of the cargo bed and configured to send air toward the front wall of the cargo bed to be diffused by the front wall of the cargo bed and to cool the heat generating object.

2. The off-road vehicle according to claim 1, wherein at least a part of the fan is provided at a position higher than the bottom wall of the cargo bed.

3. The off-road vehicle according to claim 1, wherein the at least one heat generating object comprises an electrical component shifted from the fan in a right-left direction of the off-road vehicle.

4. The off-road vehicle according to claim 1, wherein the at least one heat generating object is provided ahead of the cargo bed and below the cargo bed, and wherein the fan is configured to send the air rearward and downward toward the front wall of the cargo bed.

5. The off-road vehicle according to claim 4, further comprising an exhaust assembly provided immediately under the cargo bed and comprising an exhaust pipe connected to the internal combustion engine,
wherein an imaginary projection region is obtained by projecting a discharge opening of the fan in an air sending direction in which the air is sent,
wherein a part of the imaginary projection region is oriented toward the front wall of the cargo bed, and
wherein an other part of the imaginary projection region is oriented toward a space immediately under the front wall of the cargo bed.

6. The off-road vehicle according to claim 4,
wherein the internal combustion engine is provided ahead of the cargo bed and below the cargo bed, and
wherein the at least one heat generating object comprises
a first electrical component provided at the internal combustion engine, and
a second electrical component shifted from the internal combustion engine in a right-left direction of the off-road vehicle.

7. An off-road vehicle comprising:
a vehicle body frame;
a cabin in which a passenger seat supported by the vehicle body frame is provided;
a cargo bed supported by the vehicle body frame and provided behind the cabin, the cargo bed including a front wall and a bottom wall;
an engine room provided behind the cabin, below the cargo bed, and ahead of the cargo bed;
an internal combustion engine provided in the engine room and supported by the vehicle body frame;
at least one heat generating object provided in the engine room and ahead of the cargo bed;
a fan provided in a space behind the cabin and ahead of the cargo bed and configured to send air toward the front wall of the cargo bed; and
an exhaust assembly provided immediately under the cargo bed and comprising an exhaust pipe connected to the internal combustion engine,
wherein the vehicle body frame comprises a cross-frame extending in a right-left direction of the off-road vehicle along a lower edge of the front wall of the cargo bed, and
wherein a discharge opening of the fan faces the exhaust assembly across a gap between the cross-frame and the lower edge of the front wall of the cargo bed.

8. The off-road vehicle according to claim 7, wherein the lower edge of the front wall of the cargo bed comprises:
a first portion shifted outward from the fan in the right-left direction of the off-road vehicle, and
a second portion aligned with the fan in the right-left direction of the off-road vehicle, and
wherein a distance between the second portion and the cross-frame in the gap is larger than a distance between the first portion and the cross-frame in the gap.

9. The off-road vehicle according to claim 1, wherein the vehicle body frame comprises a cross-frame extending in a right-left direction of the off-road vehicle along a lower edge of the front wall of the cargo bed, and
wherein the cargo bed further comprises a tapered wall that connects the bottom wall and the front wall to each other and that is inclined frontward and upward from a front edge of the bottom wall toward the lower edge of the front wall.

10. The off-road vehicle according to claim 9, wherein the cargo bed further comprises a reinforcing rib group protruding downward from a lower surface of the bottom wall, the reinforcing rib group comprising:

first ribs extending in a front-rear direction of the off-road vehicle from the lower surface of the bottom wall to a lower surface of the tapered wall, the first ribs being provided at intervals in a right-left direction of the off-road vehicle; and second ribs extending in the right-left direction of the off-road vehicle and provided at intervals in the front-rear direction of the off-road vehicle, the second ribs being not provided at the tapered wall.

11. The off-road vehicle according to claim 1, further comprising a heat exchanger, wherein the fan is provided at a rear surface of the heat exchanger.

12. The off-road vehicle according to claim 1, wherein the at least one heat generating object comprises an electrical component comprising an ignition device for the internal combustion engine.

\* \* \* \* \*